Patented June 17, 1947

2,422,318

UNITED STATES PATENT OFFICE 2,422,318

PRODUCTION OF AROMATIC COMPOUNDS

Murray Gray Sturrock and Thomas Lawe, Montreal, Quebec, Canada, assignors to Dominion Tar & Chemical Company Limited, Montreal, Quebec, Canada No Drawing. Application August 21, 1945, Serial No. 611,910

10 Claims. (Cl. 260—668)

This invention relates to the production of styrenes and other aromatic compounds by simple molecular decomposition of diaryl substituted paraffins, the aryl groups of which are attached to the same carbon atom of the paraffin, and their nuclear substituted derivatives.

In our Patent No. 2,373,982 which issued April 17, 1945, we disclosed a method of producing styrenes and other aryl compounds from diaryl substituted paraffins having the aryl groups attached to the same carbon atom in the paraffin chain and in this patent we have disclosed and claimed the use of the hydrated aluminum silicates as catalysts for the reaction.

An object of the present invention is to provide catalysts which are effective for the conversion of diaryl substituted paraffins, having at least two carbon atoms in the paraffin chain and having the aryl groups attached to the same carbon atom, into two aromatic compounds including one which has an aliphatic side-chain containing a carbon-to-carbon double bond.

Another object of the present invention is to provide siliceous catalysts which do not contain any aluminum and which are effective for converting diaryl paraffins of the aforementioned type and the like into other aromatic compounds.

These and other objects are attained by employing a metal silicate catalyst for the aforementioned type of reaction where the metal of said silicate catalyst is in Group IV (a) of Mendeleeff's Periodic Table. Thus our process comprises contacting a vapour including a substance of the class consisting of diaryl substituted paraffins having at least two carbon atoms in the paraffin chain and having the aryl groups attached to the same carbon atom in the paraffin chain, and their nuclear substituted derivatives, with a catalyst which is a metal silicate, the metal of which is in Group IV (a) of Mendeleeff's Periodic Table, at a temperature of at least 350° C. It is preferable that the contact time be less than 0.4 second and it is generally desirable to employ a contact time of at least 0.004 second in order to avoid practical difficulties. The optimum contact time is about 0.05 second to about 0.1 second and at such contact times the preferred reaction temperature is about 500° C. Still another preferable feature of our process is the use of a diluent in relatively high proportions namely from about 5 to 150 or more moles of diluent per mole of the diaryl substituted paraffin. Water vapour is one of the more desirable diluents since it may be easily condensed and thereby separated from the final products and also because of the fact that water vapour may assist in maintaining the catalyst in a highly active condition.

The following examples in which the proportions are in parts by weight and are given by way of illustration and not in limitation.

Example 1

A zirconium silicate catalyst (catalyst "A"), in the form of particles of from 4–8 mesh size, is packed into a reaction tube, and 510 parts of di-(m-xylyl) ethane together with about 660 parts of water are passed through the tube in vapour form at a temperature of 500° C. 491 parts of water-free condensate are recovered, the balance of 19 parts representing a 3.7% pyrolysis loss.

The 491 parts of condensate are distilled in a stripping still under vacuum to yield 189 parts of a light oil and 300 parts of unchanged di-(m-xylyl) ethane, while a distillation loss of 2 parts, or 0.4% is incurred. The 189 parts of light oil are fractionated through an efficient column in the presence of a polymerization inhibitor. About 86 parts of pure m-xylene, 91 parts of 2,4-dimethyl styrene, 8 parts of 1,3-dimethyl-4-ethyl benzene are obtained, the remaining 4 parts representing a fractionation residue and loss of 2.1%.

The yield of styrene on the basis of the dixylyl ethane consumed and lost represents 77.8% of the theoretical, and the recovery of xylene on the same basis is 91.5% of the theoretical.

The time of contact of the vapours with the catalyst, calculated on the assumption that the catalyst contains 50% voids, and neglecting the pressure drop across the catalyst bed and the change in volume of the vapours caused by the reaction is 0.052 second.

Example 2

326 parts of a titanium silicate catalyst (catalyst "B") in the form of particles about 4–8 mesh in size are packed into a reaction tube heated to about 500° C. and 579 parts of 1,1-di-p-tolyl ethane together with about 1160 parts of steam, both preheated to 500° C. are passed through the tube at such a rate as to give a contact time with the catalyst of about 0.04 second. The vapours after passage through the catalyst are condensed in a water-cooled, steel-coil condenser and about 567 parts of hydrocarbon condensate are obtained. A pyrolysis loss amounting to about 12 parts, or 2.1% by weight in incurred.

The hydrocarbon condensate is distilled in a stripping still under vacuum, and about 198 parts of a light oil, boiling below about 250° C. at atmospheric pressure, are obtained, together with 361 parts of unchanged ditolyl ethane leaving about 8 parts of a high-boiling residue and distillation loss. The light oil is fractionated under vacuum using an efficient fractionating column and a suitable polymerization inhibitor. About 88.8 parts of toluene, 14.6 parts of ethyl toluene, and about 86 parts of p-methyl styrene are obtained by this fractionation. This represents a yield of about 70% of the theoretical yield of p-methyl styrene based upon the ditolyl ethane consumed and lost.

*Preparation of catalyst "A"*

30 parts of pure crystalline sodium silicate are dissolved in 600 parts of distilled water, and 40 parts of concentrated hydrochloric acid (37% HCl) dissolved in 200 parts of distilled water are added. About 15 parts of concentrated aqueous ammonium hydroxide (28–29% $NH_4OH$) are then added, and the precipitated silica hydrogel is filtered off, and washed three times by agitating with 300 parts of warm distilled water and filtering. 50 parts of wet, pressed silica hydrogen are recovered from this process. This is suspended in 200 parts of distilled water.

12.4 parts of zirconium sodium sulphate are dissolved in 100 parts of boiling distilled water and added to the silica hydrogel suspension, and the whole agitated for 15 minutes. Aqueous ammonia hydroxide solution (10% $NH_4OH$) is then added while stirring until the pH of the mixture reaches about 8, thus precipitating zirconium silicate which is filtered off, and washed twice by agitating with 300 parts of boiling distilled water and filtering. It is then dried in an oven for 16 hours at 170° C.

*Preparation of catalyst "B"*

About 264 parts of pure sodium meta-silicate are dissolved in 6000 parts of distilled water. To the resulting solution about 350 parts of concentrated hydrochloric acid (37%) dissolved in 2000 parts of distilled water, are added with agitation.

Sufficient 8.5 N aqueous ammonium hydroxide solution is added to bring the pH to about 7. The solution is then made slightly acid by the addition of a small amount of hydrochloric acid. The silicic acid thus precipitated is filtered and washed three times by agitating with 6000 parts of distilled water and filtering. The washed silicic acid is suspended in 2000 parts of distilled water.

About 94 parts of titanium tetrachloride are slowly added to 1000 parts of distilled water contained in a suitable vessel provided with an agitator and means for cooling. During the addition of the titanium tetrachloride, the liquid is agitated and the vessel is maintained at about room temperature by cooling. The resulting solution is added to the silicic acid suspension prepared in the manner described above, and during the addition, the suspension is continuously agitated. Thereafter the pH of the suspension is adjusted to about 8 by the addition of 8.5 N aqueous ammonium hydroxide solution. The agitation is continued for about 15 minutes, and then the titanium silicate, which has precipitated, is filtered off and washed three times by agitating with 3000 parts of distilled water and filtering. The precipitate is dried for about 15 hours at a maximum temperature of 175° C.

Other catalysts may be prepared in the same general manner as described above using any one or a plurality of the metals of Group IV (a) of Mendeleeff's Periodic Table as published in Lange's Handbook of Chemistry, second edition, published by Handbook Publishers Inc., pp. 18–19. Thus, for example, mixed silicates containing both titanium and zirconium, or those containing zirconium and thorium, zirconium and hafnium or three component silicates such as those containing zirconium, titanium and hafnium or thorium may be used in accordance with the present invention. Cerium may be included in our catalysts and any of the rare earth elements may be substituted for part or all of the cerium. Furthermore, various mixtures of the rare earths including cerium may be employed in making silicates containing a metal of group IV (a) of the periodic table, which are useful in accordance with the present invention.

The silicates which we use are easily prepared by precipitating the metal of group IV (a) of the periodic table (in oxide or hydroxide form) onto a silica hydrogel but they may also be prepared by coprecipitating the metal oxide (or hydroxide) along with a silica hydrogel. A plurality of metals of group IV (a) may be similarly precipitated either simultaneously or in two or more steps. The silicates may contain other inert or activating metals and these may be precipitated or coprecipitated with the silica hydrogel either simultaneously with, before, or after the precipitation of the metal of group IV (a). After the precipitation of the metals is completed, the resulting silicates are thoroughly washed, dried and preferably calcined at a temperature of 150°–500° C. The materials which we term "silicates" are believed to be true silicates (with varying degrees of hydration) but we are not limited to this since they may be complex oxides or intimate mixtures of $SiO_2$ and $Me_x(O)_y$, where Me stands for a metal of group IV (a) of the periodic table, together with various proportions of water.

Generally speaking our catalysts are employed in a finely divided condition, fashioned into pellets which are preferably not larger than about 5 mm. in their greatest diameter. The pellets may be cubicle, spherical or of an irregular granular shape. When large pellets are employed the vapour velocity varies widely between the centre and the outside of the pellet and therefore the contact time at the centre of the pellet is longer than desirable. We find it is desirable to have the particles as fine as possible in order to reduce the difference between the maximum and the minimum vapour velocities which occur in the catalyst. Obviously the particle size should not be so small that the catalyst packs thereby causing the vapours to channel through the catalyst instead of passing through in a uniform manner.

The silicate catalysts which we use in accordance with this invention may contain other substances which activate them or other substances which are entirely inert and are used merely to extend the active surface of the silicate catalysts or which are used as supports or binders for the silicate catalysts.

Our catalysts may be supported upon finely divided substances such as silicon carbide, non-porous aluminum oxide (such as those materials sold under the trade names "Alfrax," "Alundum"), highly fired ceramic materials in the form of rings, saddles, grids, etc. Binding agents such as sodium silicate may be advantageously used in some cases to improve the mechanical stability of the catalysts.

The converter in which the catalyst is placed may be a tube constructed of steel, silica, or any other suitable material and in large scale operations the converter may comprise a plurality of such tubes, or it may be a shell type converter having one or more layers or trays of catalyst therein.

As pointed out previously, a short contact time is desirable in carrying out the processes of this invention. While longer contact times may be used if desired, it is preferable that the contact time be less than 0.4 seconds. Contact times between about 0.1 and 0.01 second are especially suitable. The calculation of the contact time of the vapour with the catalyst is a complex matter and in order to simplify this calculation we have used the term "contact time" herein to mean those values which are computed on the assumption that the catalyst contains 50% voids and neglecting both the pressure drop through the catalyst and the increase in volume which occurs during the reaction.

Since no great amount of heat is evolved or taken up by our reaction, it is only necessary to make provision for supplying sufficient heat to take care of the conduction and radiation losses in order to maintain the reaction temperature of the vapours passing through the catalyst providing that the vapours which are fed to the catalyst are preheated to about the desired reaction temperature. We therefore prefer that the vapours fed to the catalyst be preheated to the reaction temperature. Any suitable method of heating the converter may be employed such as for example electrical resistance heaters.

The following are illustrative of the aliphatic compounds having two aryl substituents attached to the same carbon atom thereof which may be converted into the mononuclear aromatic compounds in accordance with the present invention: 1,1-diphenyl ethane, each of the 1-phenyl-1-tolyl ethanes, each of the 1,1-ditolyl ethanes, each of the 1-phenyl-1-xylyl ethanes, each of the 1-tolyl-1-xylyl ethanes, each of the 1,1-dixylyl ethanes, 1,1-diphenyl propane, each of the 1-phenyl-1-tolyl propanes, each of the 1,1-ditolyl propanes, each of the 1-tolyl-1-xylyl propanes, each of the 2,2-ditolyl propanes, each of the 1,1-di-(monochlorophenyl) ethanes, each of the 1,1-di-(dichlorophenyl) ethanes, each of the 1,1-di-(monohydroxy phenyl) ethanes, each of the 1,1-di-cresyl ethanes, each of the 2,2-di-cresyl propanes, each of the 1,1-di-naphthyl ethanes, each of the 1,1-dixenyl ethanes, each of the 1-tolyl-1-naphthyl ethanes, and the like and their nuclear substituted halogen, hydroxyl and other derivatives all of which are volatile at the temperature and pressure used in the process. Those substances containing tolyl, xylyl, cresyl, xenyl, monochlorophenyl and dichlorophenyl groups may be attached to the carbon atom of the paraffin chain at the ortho, meta or para positions and when two of these groups are present they may be attached in the same or different positions.

The reaction temperature may be varied from about 350° C. up to about 600° C. or even higher in some cases. Temperatures above 600° C. cause some pyrolysis loss but on the other hand some of the diaryl paraffins are not easily decomposed at low temperatures. It is particularly important that a short contact time be employed when temperatures in the neighborhood of 500-600° C. are used in order to avoid an undesired amount of loss by pyrolysis and side reactions.

One of the advantages of employing a short contact time with the catalyst is that the life thereof is prolonged almost indefinitely. With contact times of the order of one second or more, the catalyst becomes fouled in a relatively short period of time due to the deposition of carbonaceous materials on the surface of the catalyst. When it is necessary or desirable to reactivate the catalyst, this may be done by passing heated air, preferably mixed with steam or carbon dioxide, through the catalyst. The temperature of the air and steam mixture should be raised to about 590° C. to 650° C. The air enables the carbon to burn whereas the steam which is used in conjunction with the air keeps the temperature from rising too high which might cause a reduction in the activity of the catalyst. Generally at temperatures of about 590° C., carbon begins to burn off and the heat of reaction causes the temperature to rise to about 650° C. without the application of any external supply of heat. It may be seen that the proximity of the reactivation temperature to the reaction temperature greatly simplifies the change from normal operation to reactivation and back to normal operation. Since the normal active life of the catalyst greatly exceeds the time required for its reactivation, in this manner the use of two or more converters in parallel is readily accomplished. The short time of reactivation enables one to keep one or more converters in normal operation while one or more other converters are being reactivated.

Any material which is volatile and which does not react with the diaryl paraffin employed in our reaction, nor with the products formed by the decomposition thereof, may be used as a diluent. Among these, some examples are: water, the hydrocarbons (such as benzene and toluene), the fixed gases (such as nitrogen and carbon dioxide) etc. Water vapour is a preferred diluent inasmuch as it may be readily condensed and therefore separated from the products of the reaction, whereas the fixed gases or hydrocarbons are somewhat more difficult to separate from the products of reaction and such separation requires higher expenditures than are required for the separation of water from the product. Water vapour also has an additional advantage in that it may maintain the catalyst in highly active form.

One of the more important reasons for the use of the diluent is that the time of contact of the diaryl substituted paraffin with the catalyst can be reduced to the desired point easily. It has been found that in order to obtain the short contact times which are desirable in accordance with the present invention, the molal ratio of diluent to the diaryl substituted paraffin in the feed to the catalyst is preferable betweeen about 5:1 and 150:1 or more. If the feed can be supplied rapidly enough to provide a low contact time without the use of a large proportion of diluent, the ratio of diluent to the diaryl substituted paraffin may be as low as 1:2.

It has been found that it is frequently desirable to convert only a few per cent of the diaryl substituted paraffin fed to the catalyst in one pass but by recovering the unconverted diaryl substituted paraffin and recirculating it from one to five times or more, a high yield is obtained very economically.

Our process may be operated at elevated or reduced pressure, and under some conditions it is particularly advantageous to operate under reduced pressure. If the diaryl substituted paraffin which is to be decomposed is not readily volatile at ordinary presures, reduced pressures may be used, thereby facilitating the operation of our process.

It will now be clear that we have provided a convenient and economical method of converting the diaryl substituted paraffins having at least two carbon atoms in the paraffin chain and having the two aryl groups attached to the same carbon atom into other aromatic compounds, one of which contains a side chain having an ethylenic group. The vinyl substituted aryl compounds prepared in accordance with the present invention have wide utility in the production of polymers which in turn are useful for molding, casting, laminating and for many other purposes. We are able to produce aryl compounds such as xylene or one of the similar aryl compounds in extremely high purity since when a diaryl substituted paraffin is cracked in accordance with this invention, one molecule of an aryl compound having an ethylenic side chain is obtained together with one molecule of a pure aryl compound. Such pure aryl compounds, as for example, pure m-xylene or pure p-xylene, find utility in the synthesis of organic compounds where the presence of one or more of the possible isomers is undesired.

We claim:

1. A process of producing a plurality of aromatic compounds which comprises heating a paraffin having at least two carbon atoms and having two aryl substituents attached to one of said carbon atoms at a temperature which will cause said paraffin to decompose into a plurality of aromatic compounds in the presence of a catalyst and which is at least 350° C. in the presence of a metal silicate, which metal is in Group IV (a) of Mendeleeff's Periodic Table.

2. A process of producing a plurality of aromatic compounds which comprises contacting a substance selected from the class consisting of paraffins having at least two carbon atoms in the paraffin chain and having two aryl substituents attached to one carbon atom thereof, and their nuclear substituted derivatives at a temperature which will cause said paraffin to decompose into a plurality of aromatic compounds in the presence of a catalyst and which is at least 350° C. with a metal silicate catalyst which promotes simple molecular decomposition into two aromatic compounds, said metal being in Group IV (a) of Mendeleeff's Periodic Table.

3. A process of producing a plurality of aromatic compounds which comprises mixing a substance selected from the class consisting of diaryl substituted paraffins having at least two carbon atoms in the paraffin chain and in which both aryl groups are attached to the same carbon atom, and their nuclear substituted derivatives, with a diluent, contacting the resulting mixture thereof with a metal silicate catalyst, which metal is in Group IV (a) of Mendeleeff's Periodic Table, and maintaining the temperature of said mixture at a temperature which will cause said paraffin to decompose into a plurality of aromatic compounds in the presence of a catalyst and which is at least 350° C. during the time it is in contact with said catalyst.

4. In a method of producing mononuclear aromatic compounds, the steps which comprise heating one of a class of substances consisting of asymmetric diaryl ethanes, the aryl groups of which are mononuclear, and their nuclear substituted derivatives, at a temperature which will cause said paraffin to decompose into a plurality of aromatic compounds in the presence of a catalyst and which is at least 350° C., passing the resulting heated substance through a metal silicate catalyst which promotes simple molecular decomposition, said metal being in Group IV (a) of Mendeleeff's Periodic Table, together with a diluent at such a rate as to provide a contact time with the catalyst of between about 0.004 second and about 0.4 second.

5. A process as in claim 4 wherein said diluent is water vapour.

6. In a method of producing a plurality of aromatic compounds, the steps which comprise heating a substance of the class consisting of diaryl substituted paraffins having at least two carbon atoms in the paraffin chain and having both aryl groups attached to one of the carbon atoms, and their nuclear substituted derivatives, to a temperature which will cause said paraffin to decompose into a plurality of aromatic compounds in the presence of a catalyst and which is at least 350° C., passing said substance through a finely divided metal silicate catalyst said metal being in Group IV (a) of Mendeleeff's Periodic Table and with a contact time of less than 0.4 second.

7. In a method of producing a plurality of aromatic compounds, the step which comprises contacting an asymmetric diaryl ethane with a zirconium silicate catalyst at a temperature which will cause said paraffin to decompose into a plurality of aromatic compounds in the presence of a catalyst and which is at least 350° C. and for a contact time of less than 0.4 second.

8. In a method of producing a plurality of aromatic compounds, the step which comprises contacting an asymmetric diaryl ethane with a titanium silicate catalyst at a temperature which will cause said paraffin to decompose into a plurality of aromatic compounds in the presence of a catalyst and which is at least 350° C. and for a contact time of less than 0.4 second.

9. In a method of producing a plurality of aromatic compounds including a dimethyl styrene and a xylene, the step which comprises contacting a 1,1-dixylyl ethane with a zirconium silicate catalyst at a temperature of about 500° C. and for a contact time of about 0.1–0.01 second.

10. In a method of producing a plurality of aromatic compounds including a mono methyl styrene and toluene, the step which comprises contacting a 1,1-ditolyl ethane with a zirconium silicate catalyst at a temperature of about 500° C. and for a contact time of about 0.1–0.01 second.

MURRAY GRAY STURROCK.
THOMAS LAWE.

REFERENCES CITED

The following references are of record in the file of this patent:

UNITED STATES PATENTS

| Number | Name | Date |
|---|---|---|
| 2,373,982 | Sturrock et al. | Apr. 17, 1945 |
| 2,344,911 | Young | Mar. 21, 1944 |
| 2,223,162 | Benedict | Nov. 26, 1940 |
| 2,382,239 | Lee | Aug. 14, 1945 |
| 2,282,327 | Dreisbach | May 12, 1942 |
| 2,308,415 | Dreisbach | Jan. 12, 1943 |

OTHER REFERENCES

Sheibley et al., Jour. Am. Chem. Soc., vol. 62, 840–1 (1940), in Patent Office Library.